(12) United States Patent
Raymond (10) Patent No.: US 9,755,389 B2
(45) Date of Patent: Sep. 5, 2017

(54) TWISTED LEAK DETECTION CABLE (71) Applicant: Raymond & Lae Engineering, Inc., Fort Collins, CO (US)

(72) Inventor: Donald M. Raymond, Fort Collins, CO (US)

(*) Notice: Subject to any disclaimer, the term of this patent is extended or adjusted under 35 U.S.C. 154(b) by 737 days.

(21) Appl. No.: 14/101,237

(22) Filed: Dec. 9, 2013

(65) Prior Publication Data
US 2014/0130350 A1 May 15, 2014

Related U.S. Application Data (60) Continuation of application No. 13/268,140, filed on Oct. 7, 2011, now Pat. No. 8,601,679, which is a division of application No. 12/464,787, filed on May 12, 2009, now Pat. No. 8,063,309.

(60) Provisional application No. 61/059,634, filed on Jun. 6, 2008.

(51) Int. Cl.
| H01R 43/00 | (2006.01) |
| G01M 3/16 | (2006.01) |
| H01B 7/32 | (2006.01) |

(52) U.S. Cl.
CPC .......... *H01R 43/005* (2013.01); *G01M 3/165* (2013.01); *H01B 7/322* (2013.01); *Y10T 29/49117* (2015.01); *Y10T 29/49123* (2015.01); *Y10T 29/49204* (2015.01); *Y10T 29/49224* (2015.01); *Y10T 29/49227* (2015.01)

(58) Field of Classification Search
CPC ...... H01R 43/005; G01M 3/165; H01B 7/322
USPC ....... 29/828, 874, 885, 876; 174/113, 113 R; 73/40.5 R; 156/51, 244.12
See application file for complete search history.

(56) References Cited

U.S. PATENT DOCUMENTS

| 3,662,367 A | 5/1972 | DeVeau et al. |
| 3,759,552 A | 9/1973 | Levinsohn |
| 3,981,181 A | 9/1976 | Ochiai |
| 4,029,889 A | 6/1977 | Mizuochi |

(Continued)

FOREIGN PATENT DOCUMENTS

| EP | 0160441 | 11/1985 |
| EP | 0164838 | 12/1985 |

(Continued)

OTHER PUBLICATIONS

U.S. Appl. No. 13/268,140, filed Oct. 7, 2011, by Donald M. Raymond.

(Continued)

*Primary Examiner* — Peter DungBa Vo
*Assistant Examiner* — Kaying Kue
(74) *Attorney, Agent, or Firm* — William W. Cochran; Cochran Freund & Young LLC (57) ABSTRACT

Disclosed is a leak detection cable that has an outer jacket layer and a four wire construction in a flat wire configuration that is twisted in a helix. Detection cables are disposed on the exterior surface adjacent openings of the jacket to allow for detection of aqueous fluids. The wire is twisted in a helix to allow adjacent detector wires to easily detect aqueous fluids. Disparate materials are used for the jacket and the coatings of the wires, to allow the jacket to be easily removed from the wires without affecting the integrity of the coatings of the wires. The four flat wire configuration is sized and spaced for easy connection to an insulation displacement connector.

2 Claims, 8 Drawing Sheets

(56) References Cited

U.S. PATENT DOCUMENTS

| | | | |
|---|---|---|---|
| 4,206,402 | A | 6/1980 | Ishido |
| 4,243,574 | A | 1/1981 | Manwiller |
| 4,373,768 | A | 2/1983 | Clarke |
| 4,386,231 | A | 5/1983 | Vokey |
| 4,417,782 | A | 11/1983 | Clarke et al. |
| 4,436,566 | A | 3/1984 | Tight |
| 4,468,536 | A | 8/1984 | Van Noten |
| 4,505,542 | A | 3/1985 | Clarke |
| 4,570,477 | A | 2/1986 | Sugibuchi |
| 4,594,638 | A | 6/1986 | Suzuki et al. |
| 4,614,557 | A | 9/1986 | Wille et al. |
| 4,677,371 | A | 6/1987 | Imaizumi |
| 4,767,652 | A | 8/1988 | Willie et al. |
| 4,797,621 | A | 1/1989 | Anderson et al. |
| 4,843,327 | A | 6/1989 | Koppitsch et al. |
| 4,862,146 | A | 8/1989 | McCoy et al. |
| 4,862,148 | A | 8/1989 | Kichline |
| 4,877,923 | A | 10/1989 | Sahakian |
| 4,910,998 | A | 3/1990 | Willis et al. |
| 4,922,183 | A | 5/1990 | Kamas |
| 4,926,129 | A | 5/1990 | Wasley et al. |
| 4,926,165 | A | 5/1990 | Lahlouh |
| 4,931,741 | A | 6/1990 | Koppitsch et al. |
| 4,949,076 | A | 8/1990 | Wann |
| 4,970,466 | A | 11/1990 | Bolles et al. |
| 5,015,958 | A | 5/1991 | Masia et al. |
| 5,101,657 | A | 4/1992 | Lahlouh et al. |
| 5,134,377 | A | 7/1992 | Reddy et al. |
| 5,136,249 | A | 8/1992 | White et al. |
| 5,144,250 | A | 9/1992 | Little |
| 5,159,276 | A | 10/1992 | Reddy |
| 5,172,730 | A | 12/1992 | Driver |
| 5,177,996 | A | 1/1993 | Sahakian |
| 5,191,292 | A | 3/1993 | Klotz et al. |
| 5,203,202 | A | 4/1993 | Spencer |
| 5,235,286 | A | 8/1993 | Masia et al. |
| 5,334,970 | A | 8/1994 | Bailey |
| 5,342,218 | A | 8/1994 | McMills et al. |
| 5,355,720 | A | 10/1994 | Bailey |
| 5,381,097 | A | 1/1995 | Takatori et al. |
| 5,382,909 | A | 1/1995 | Masia et al. |
| 5,402,828 | A | 4/1995 | Pino |
| 5,410,255 | A | 4/1995 | Bailey |
| 5,767,441 | A * | 6/1998 | Brorein ................ H01B 11/002 174/27 |
| 5,807,447 | A * | 9/1998 | Forrest .................. H01B 9/028 156/244.12 |
| 5,918,267 | A | 6/1999 | Evans et al. |
| 6,144,209 | A | 11/2000 | Raymond et al. |
| 6,175,310 | B1 | 1/2001 | Gott |
| 6,526,807 | B1 | 3/2003 | Doumit et al. |
| 6,734,364 | B2 | 5/2004 | Price et al. |
| 6,777,947 | B2 * | 8/2004 | McCoy ................ G01M 3/165 324/449 |
| 7,081,759 | B2 * | 7/2006 | Raymond ............. G01M 3/165 324/449 |
| 7,167,351 | B2 | 1/2007 | Raymond |
| 7,212,009 | B2 | 5/2007 | Raymond et al. |
| 8,063,309 | B2 * | 11/2011 | Raymond ............. G01M 3/165 174/113 R |
| 8,234,910 | B2 | 8/2012 | Raymond |
| 8,256,269 | B2 | 9/2012 | Raymond |
| 8,601,679 | B2 * | 12/2013 | Raymond ............. G01M 3/165 174/113 R |
| 2002/0071113 | A1 | 6/2002 | Moran et al. |
| 2005/0115664 | A1 | 6/2005 | Musahl et al. |
| 2006/0020107 | A1 | 1/2006 | Hatfield |
| 2009/0023329 | A1 * | 1/2009 | Mehnert ............ H01R 13/7175 439/490 |
| 2012/0027927 | A1 | 2/2012 | Raymond |

FOREIGN PATENT DOCUMENTS

| | | |
|---|---|---|
| EP | 0354733 | 9/1989 |
| EP | 0866326 | 9/1998 |
| EP | 1273897 | 1/2003 |
| FR | 2709347 | 8/1993 |
| FR | 2773613 | 7/1999 |
| WO | 9114306 | 9/1991 |

OTHER PUBLICATIONS

U.S. Appl. No. 13/535,779, filed Jun. 28, 2012, by Donald M. Raymond.
U.S. Appl. No. 13/565,949, filed Aug. 3, 2012, by Donald M. Raymond.
U.S. Appl. No. 13/279,133, filed Oct. 21, 2011, by Donald M. Raymond.
U.S. Appl. No. 13/894,574, filed May 15, 2013, by Donald M. Raymond.
U.S. Appl. No. 61/177,594, filed May 12, 2009, by Donald M. Raymond.
Non-Final Office Action, mailed Feb. 16, 2011, in U.S. Appl. No. 12/464,787, filed May 12, 2009, by Donald M. Raymond.
Non-Final Office Action, mailed Mar. 12, 2013, in U.S. Appl. No. 13/268,140, filed Oct. 7, 2011, by Donald M. Raymond.

\* cited by examiner

TWISTED LEAK DETECTION CABLE

CROSS REFERENCE TO RELATED APPLICATION

The present application is a continuation application of U.S. patent application Ser. No. 13/268,140, entitled "TWISTED LEAK DETECTION CABLE," filed Oct. 7, 2011, by Donald M. Raymond, which application is a divisional application of U.S. patent application Ser. No. 12/464,787, entitled "TWISTED LEAK DETECTION CABLE," filed May 12, 2009, by Donald M. Raymond, which application is based upon and claims the benefit of U.S. Provisional Patent Application No. 61/059,634, entitled "TWISTED LEAK DETECTION CABLE", filed Jun. 6, 2008, by Donald M. Raymond. The entire content of all of the above-mentioned applications and the U.S. Provisional Patent Application filed May 12, 2009, by Donald M. Raymond, entitled "Aqueous Chemical Leak Detection Cable," are hereby specifically incorporated herein by reference for all they disclose and teach.

BACKGROUND OF THE INVENTION

Leak detection cables have been used to detect moisture in various applications. For example, leak detection cables may be used to detect leakage from appliances that leak water, such as dishwashers, hot water heaters, etc., in normal household applications, as well as in commercial applications. Leak detection systems may be used to automatically cut off water supplies, such as electrical and gas supplies, as well as providing notification for maintenance and repair services. These systems have been valuable in preventing flood damage and other damage.

SUMMARY OF THE INVENTION

An embodiment of the present invention may therefore comprise a method for making a leak detection cable comprising: extruding a conductive coating, that comprises a preselected conductive plastic, around at least one detector wire to form at least one detector conductor; extruding a non-conductive coating that comprises a preselected non-conductive plastic around at least one feedback wire to form at least one feedback conductor; extruding a jacket around the at least one detector conductor and the at least one feedback conductor so that the at least one feedback conductor is substantially surrounded by the jacket, and the at least one detector conductor is partially surrounded by the jacket by an amount sufficient to hold the at least one detector conductor in the jacket and provide an opening adjacent to the at least one detector conductor to allow exposure to aqueous fluids, the jacket comprising a plastic jacket material that is dissimilar to, and has low adhesion with, the preselected conductive plastic and the preselected non-conductive plastic so that the jacket can be easily removed from the detector conductor.

DETAILED DESCRIPTION OF THE EMBODIMENTS

Figure 1:
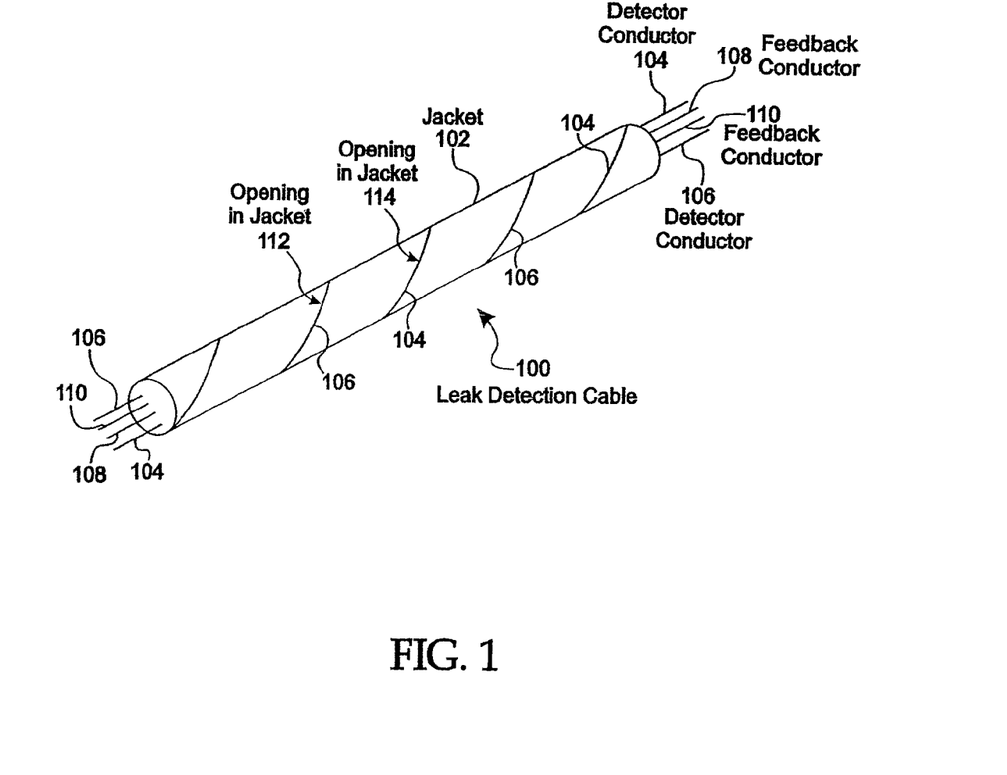
FIG. 1 is an isometric diagram of one embodiment of the invention.
Figure 2:
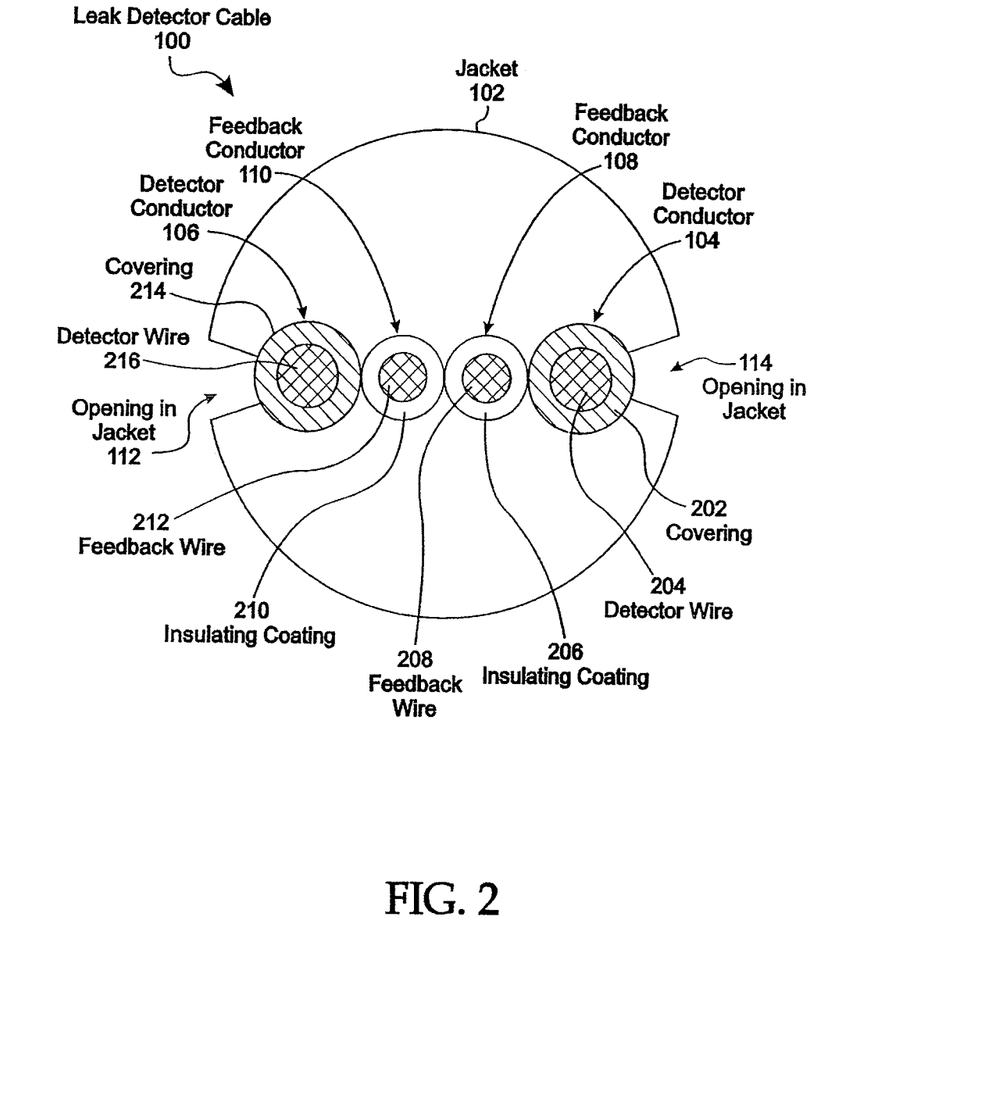
FIG. 2 is a cross-sectional view of the embodiment of FIG. 1.

FIG. 1 is an isometric view of an embodiment of a leak detection cable 100. As shown in FIG. 1, the leak detection cable includes a jacket 102 that surrounds four conductors 104-110. Conductors 104, 106 are detector conductors that have a waterproof, conductive covering. Alternatively, the detector conductors 104, 106 can be covered with a braided cover that allows water to penetrate the braided cover and contact the detector wire disposed within the detector conductors 104, 106. When waterproof conductive coatings are used, the wire inside the conductors 104, 106 is protected from corrosion, while allowing conduction through the coating to the wires in conductors 104,106. The conductive coating also increases the surface area of the detector wire which increases the sensitivity of the leak detection cable 100. Conductors 108, 110 comprise feedback conductors that provide information regarding the location or presence of the detected leak, such as through conductivity, ratiometric measurement, time domain reflectometry or other methods. Although two feedback conductors 108, 110 are shown in FIGS. 1 and 2, leak detection systems can operate with a single feedback conductor, or no feedback conductors. Also, additional feedback conductors can be utilized. Although two feedback conductors are illustrated in FIGS. 1 and 2, any number or no feedback conductors may be utilized in the various embodiments disclosed. As shown in FIG. 1, the conductors 104-110 are embedded in the jacket 102. The detector wires 108, 110 that have non-conductive insulators, are placed between the detector conductors 104, 106 in the jacket 102. Detector conductors 104, 106 are therefore disposed at the edges of the jacket 102 and are only partially embedded in the jacket 102 so that the outer edges of the detector conductors 104, 106 are exposed. Although two detector conductors 104, 106 are illustrated in FIGS. 1 and 2, moisture detector systems will operate with a single detector conductor. Similarly, although the embodiments disclosed herein show two feedback conductors, the various embodiments may operate with a single feedback conductor or no feedback conductor.

As shown in FIG. 1, jacket 102 is then heated and twisted to form a helix. The material of the jacket 102 is a cross-linked polymer, which, when heated above a certain level, can be twisted into a helix. When the cross-linked polymer cools, it crystallizes, so that the twist is held in place. Openings 114, 112, that are adjacent to detector conductors 104, 106, spiral around the outer surface of the leak detection cable 100, so that when water is disposed between adjacent openings 114, 112, a conductive path is created between detector conductors 104, 106, respectively. Further, the conductors 104-110 are disposed in the jacket 102 in a four flat configuration that has a spacing that matches standard four flat connectors, such as an insulation displacement connector 502 (FIG. 5), including an RJ-11 connector. This allows the leak detection cable 100 to be easily connected in the field.

Figure 5:
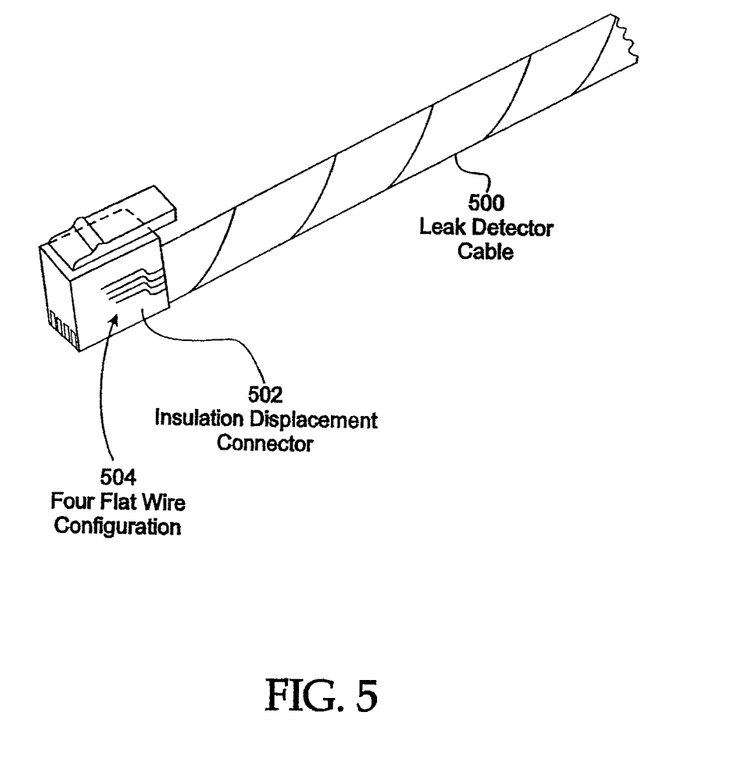
FIG. 5 is an isometric view of a leak detection cable with an insulation displacement connector.

FIG. 2 is a cutaway view of the leak detection cable 100 illustrated in FIG. 1. As shown in FIG. 2, jacket 102 surrounds the four conductors 104, 106, 108, 110. Jacket 102 has openings 112, 114 that are adjacent detector conductors 106, 104, respectively. The openings 112, 114 in jacket 102 expose the coverings 214, 202, of detector conductors 106, 104 to the exterior environment outside of the jacket 102. The coverings 202, 214 may comprise conductive coatings that allow conduction to the detector wires 204, 216, or may comprise braided coverings that allow water to penetrate the openings in the braided covering to allow conduction between the detector wires 204, 216. Since the cable is twisted, the opening 112 and the opening 114 may be resting in a pool of water from a leak, such as a leak from a hot water heater. Water has a certain amount of conductivity that provides a conductive path between openings 112, 114 to detector conductors 106, 104, respectively. Conductive coating 214 transmits electrical signals to the detector wire 216. Similarly, conductive coating 202 transmits electrical signals to detector wire 204. When there is a conductive path between openings 112, 114, as a result of a pool of water, electrical signals are transmitted between the detector wires 204, 216 to indicate the location of the leak. Feedback conductor 108 comprises a feedback wire 208 and an insulating coating 206. Feedback conductor 110 comprises a feedback wire 212 having an insulating coating 210. The insulating coatings 206, 210 separate the conductive coatings 202, 214 of the detector conductors 104, 106 and also provide insulation around the feedback wires 208, 212. Feedback conductors 108, 110 assist in detecting the location or presence of the leak, such as by use of conductivity, ratiometric measurement, time domain reflectometry or other methods. As shown in FIG. 2, the center point of detector wire 204, feedback wire 208, feedback wire 212 and detector wire 216 are evenly spaced along a horizontal plane. The substantially equal spacing of these detectors allows for the use of four flat connectors, such as the insulation displacement connector 502 (FIG. 5). The insulation displacement connector 502 (FIG. 5) is connected to the four flat wire set that is exposed after the jacket 102 is stripped from the conductors 104, 106, 108, 110. For example, the insulation displacement connector may be an RJ-11 type of connector.

The materials of the jacket 102 and the coatings 202, 206, 210, 214 may be made from dissimilar plastics. The dissimilar plastics provide ease in stripping away the jacket 102 from the coatings 202, 206, 210, 214. Again, the ability to strip away the jacket 102 from the four flat wire array allows the insulation displacement connector 502 to be easily clipped onto the end of the leak detector cable 100.

Prior to installation of the connector 502, the cable is twisted, as disclosed above, in a continuous helix. For example, the helix may have approximately one 360° turn per inch, or twelve turns per foot. The leak detector cable 100 therefore only requires water to be disposed along a surface by approximately one inch or more to detect the presence of water. The cable can be used without the helical twist, but in many instances would not operate as well.

The openings 112, 114 in the jacket 102 are sufficiently large to allow water to enter and contact coverings 214, 202, respectively, while holding the detector conductors 106, 104 in the jacket 102. Since coverings 214, 202 may be made from a dissimilar material from the jacket, the structure of the jacket 102 provides sufficient stability to hold the detector conductors 106, 104 in the jacket, both before and after the leak detector cable 100 is twisted into a tight helix. The dissimilar materials of the jacket 102 and conductive coatings 214, 202, allow easy separation, as indicated above.

For example, and not by way of limitation, the jacket 102 can be made from an extruded olefin based material, while the coverings 214, 202 can be made from a highly conductive PVC plastic coating. Detector conductors 104, 106 can be made from 24 AWG 7/32 stranded conductor to a target diameter of 0.040 inches (nominal). The detector conductors 104, 106 can be color-coded as black to distinguish the detector conductors from the feedback conductors 108, 110. The feedback conductors 108, 110 may comprise two 26 AWG stranded conductors that are insulated with a non-conductive PVC plastic compound to a target diameter of 0.035 inches (nominal). These feedback conductors 108, 110 can be color-coded as white and red to distinguish them from detector conductors 104, 106. Leak detector cable 100 is extruded in the flat layout pattern that is illustrated in FIG. 2. The diameter of the extrusion of the final jacket 102 may be 0.165 inches (nominal). As mentioned above, the outer jacket may be a polyolefin. For example, the polyolefin may be XLPE (cross-link polyethylene), polypropylene, low density polyethylene, medium density polyethylene, linear low density polyethylene, or an olefin based derivative, such as TPE. As mentioned above, the conductors 104, 108, 110, 106 are spaced evenly in a horizontal plane at the center of the jacket 102. The spacing may be approximately 0.040 inches center to center across the horizontal plane to provide ease in applying the insulation displacement connector 502, illustrated in FIG. 5, which may be an RJ-11 connector. The layout of the feedback conductors 108, 110, that have insulating coatings 206, 210 between the detector conductors 104, 106, by design provides isolation between conductive coatings 202, 214, especially when the leak detector cable 100 is twisted into a helix, which, in other designs, may cause the detector conductors 104, 106 to short together.

In accordance with another embodiment, the leak detector cable 100, illustrated in FIGS. 1 and 2, may use a polyolefin based conductive material for conductive coatings 202, 214, and a polyolefin based non-conductive material for insulating coatings 206, 210. In accordance with this embodiment, the jacket 102 is made from a PVC material so that the coatings 202, 206, 210, 214 are dissimilar to the PVC material of jacket 102, which aids in stripping the jacket 102 from the conductors 104, 106, 108, 110. In fact, a wire stripper can be used to remove the jacket 102 in both embodiments disclosed above, to expose the conductors 104, 106, 108, 110, so that a connector, such as an insulation displacement connector 502, can be easily connected to the leak detector cable 100. The use of PVC as jacket 102 provides a high degree of flame retardation and has very low smoke generating properties when combusted. Other materials can also be used that have disparate properties. For example, fluoropolymers (Teflon, PFA, Tefzel, Solef), TPE, TPR and polyurethane. Fluoropolymers can provide maximum resistance to solvents, while the other additional plastics, in varying combinations, can be used over a wide range of temperatures, from −70° C. to 250° C.

The chart provided below indicates the pairing of possible materials of jacket 102 with a conductive coating around the wire, as well as an insulating cover or coating around the wire that are dissimilar and have low affinity. Of course, mixtures of these materials can also be used. The materials can also be dry blended.

CHART 1

LEAK DETECTION CABLE MATERIALS MATRIX

| CONDUCTIVE/INSULATIVE COATINGS | JACKET | JACKET | JACKET | JACKET | JACKET |
|---|---|---|---|---|---|
| PVC | POLYOLEFIN | PVDF | TPE | TPR | |
| POLYOLEFIN | PVC | CPE | TPE | POLYESTER ELASTOMER | |
| FLUOROPOLYMER | PVC | CPE | TPE | TPR | POLYOLEFIN |
| FLUOROPOLYMER | POLYESTER ELASTOMER | PVDF | NYLON | PET | POLYURETHANE |

Conductive coatings, such as conductive coatings 202, 214, that are extruded around the detector wires 204, 216, are extruded materials which contain high levels of conductive components and/or carbon black. These combinations, in varying quantities, depending upon the compound base, provide outstanding conductive properties. The range of conductivity needed to provide effective volume resistivity is less than 100 KOhms per foot at 20° C. The materials listed as conductive/insulative coatings in the first column can be formulated/compounded/made to have the necessary conductive properties. Hence, PVC, polyolefin and Teflon can act as either an insulative coating or a conductive coating, as desired. The polyvinyl chloride (PVC) can be semi-rigid and flexible. Polyolefins may comprise polyethylenes (PE), which include: low density polyethylene (LDPE), linear low density polyethylene (LLDPE), medium density polyethylene (MDPE), high density polyethylene (HDPE) and cross linked polyethylene (XLPE). Thermoplastic elastomers (TPE) may include ultra high molecular weight (UHMW) PVC based alloys. Trade names for these products include Flexalloy and Seoprene. Polyvinylidene fluoride (PVDFP) is sold under the tradenames Solef and Kynar. Thermoplastic rubber (TPR) is an olefin based synthetic rubber. This material is sold under the tradenames Elexar, Telcar and Santoprene. Polyvinylidene fluoride (PVDF) is sold under the tradenames of Solef and Kynar. Polyester and ether based polyurethanes are referred to as TPU. Chart 1 provides the pairing of materials that are sufficiently dissimilar so as to provide a mating system that keeps the materials from sticking together.

Alternatively, a braided type of insulation can be used instead of solid coating type of insulation that allows water to seep through the braiding. The braided insulation that covers the detector wires have multiple small openings that allow aqueous materials to penetrate the braided cover and contact the detector wire. Hence, braided covers do not need to be constructed from a conductive material. Again, materials that are dissimilar to the jacket may be used for the braided cover. The braid can be constructed of cotton, polyester, aromatic polyamides/meta-aramid, copolyamide, para-amide, nylon, polyethylene, polypropylene, olefin, cellulosic fiber, art silk, synthetic fibers, silicon, fluoropolymers and others materials. Dissimilar materials may have a large disparity in melting temperature, which can be used as a guideline for selection of some materials.

Figure 3:
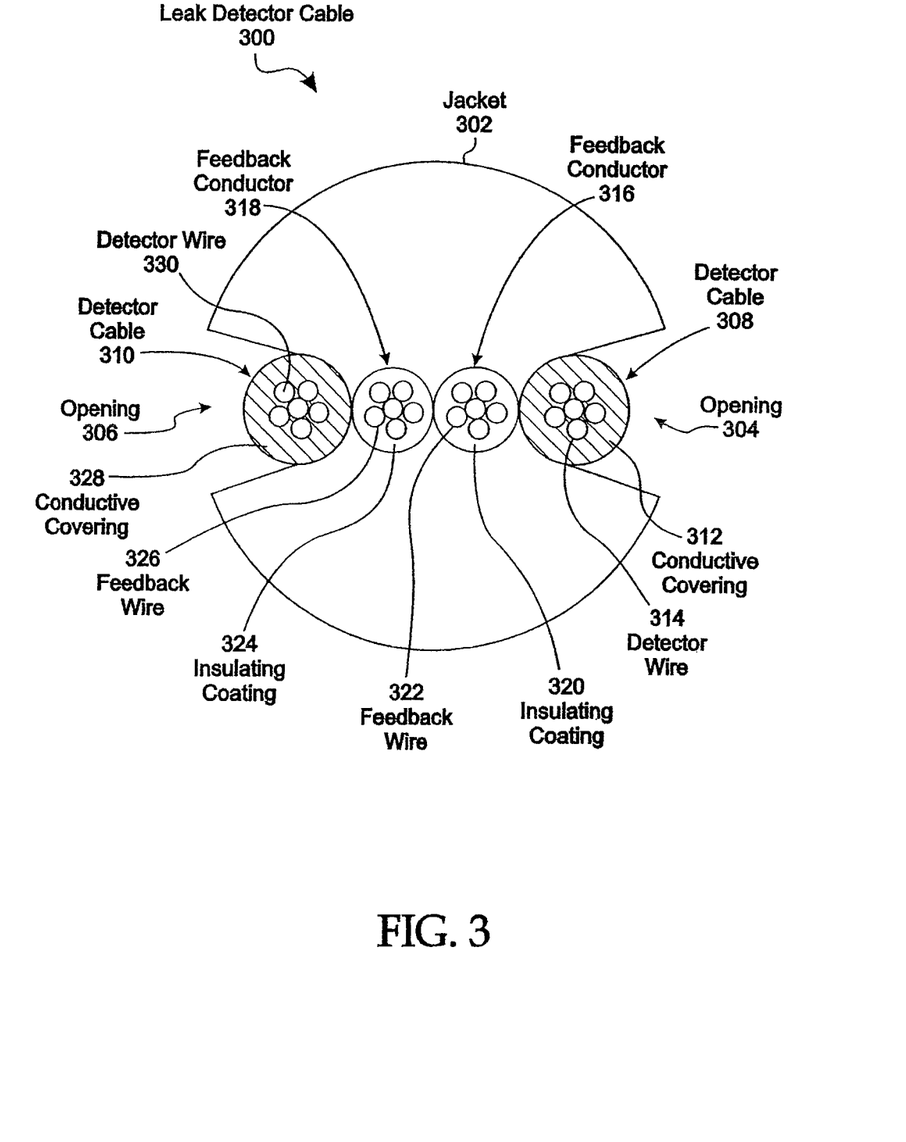
FIG. 3 is a cross-sectional view of another embodiment of the invention.

FIG. 3 illustrates another embodiment of a leak detector cable 300. As shown in FIG. 3, jacket 302 is disposed around feedback conductors 316, 318. Feedback conductors 316, 318 are disposed between detector cables 308, 310. Feedback conductor 316 comprises an insulating coating 320 that covers the feedback wire 322. Similarly, feedback conductor 318 comprises an insulating coating 324 that covers feedback wire 326. Detector cable 308 comprises a conductive coating 312 that covers the detector wire 314. Detector cable 310 comprises a conductive coating 328 that covers the detector wire 330. The conductive coatings 312, 328 are non-porous and protect detector cables 308, 310 from corrosion. Detector cable 308 is disposed in an opening 304 in the jacket 302. Opening 304 provides structure to interlock the detector cable 308 to the jacket 302, which is substantially less than that shown in the embodiment illustrated in FIG. 2. The jacket 302 and the conductive coating 312 can be made of plastics that have a higher degree of affinity, so that the jacket 302 holds the detector cable 308 in the opening 304. The advantage of the configuration illustrated in FIG. 3 is that a greater portion of the conductive coating 312 is exposed to the outside environment for detection of aqueous fluids. Opening 306 is similar to opening 304 in that jacket 302 holds the detector cable 310 in a similar manner, but can be used with materials with greater affinity. The embodiment of FIG. 3 also includes jacket material 302 disposed between the feedback conductors 316, 318 and between detector cable 308 and feedback conductor 316, as well as between detector cable 310 and feedback conductor 318. This structure allows for greater isolation of detector cables 308, 310.

Figure 4:
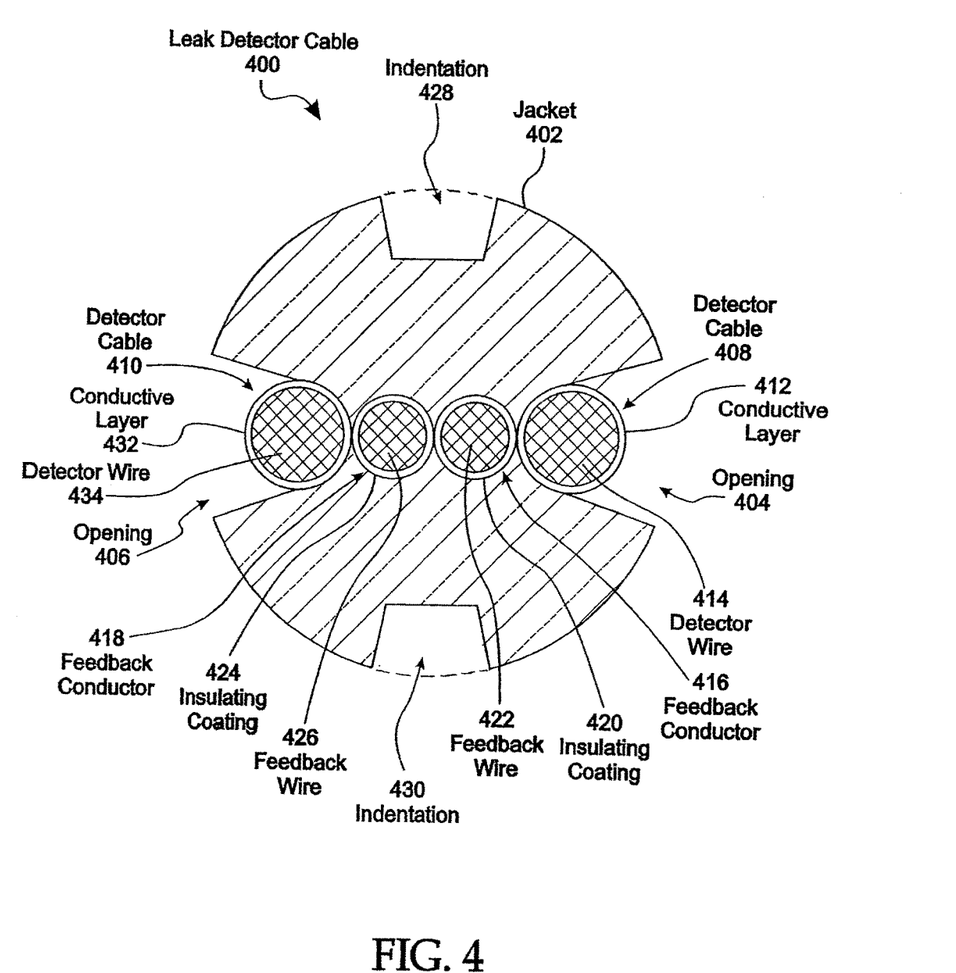
FIG. 4 is a cross-sectional view of another embodiment of the invention.

FIG. 4 is an illustration of another embodiment of a leak detection cable 400. As shown in FIG. 4, jacket 402 surrounds detection cable 408, feedback conductor 416, feedback conductor 418 and detection cable 412. Detection cable 408 comprises a conductive layer 412, which surrounds a conductive wire 414. Detector cable 410 has a conductive layer 432 that surrounds the detector wire 434. Conductive layers 412, 432 are non-porous and protect the detector wires 414, 434 from corrosion as a result of exposure to aqueous fluids. In addition, the conductive layers increase the surface area of conductive material that is exposed to the environment as compared to a smaller wire that is not covered by the conductive coating. In addition, the conductive coatings 412, 434 can be selected from a material that has greater affinity with the jacket 402 to hold the detection cables 408, 410 in the jacket 402, if greater adhesion to the jacket 402 is needed, or a material that has greater dissimilarity with jacket 402 if less adhesion is desired. In other words, the layers 412, 420, 424 and 432 can all be selected, as desired, to obtain the desired adhesion to the jacket 402. Feedback conductors 416, 418 are disposed between the detector cables 408, 410 in a horizontal plane, to again provide insulation, so that the detector cables 408, 410 do not short out when the leak detection cable 400 is twisted into a helix. Optional indentations 428, 430 reduce the amount of material in the jacket 402 and provide some stability for the jacket 402 when placed in the field. The optional indentations also provide an orientation for tooling and for proper stripping of the jacket 402. In that regard, only one indentation may be required in the jacket 402.

Jacket 402 extends more than half way around the surface of the detection cables 408, 410 to provide structural stability to lock the detector cables 408, 410 into the jacket 402. In the embodiment disclosed in FIG. 4, a large surface area is provided for exposure to aqueous fluids to ensure detection of these fluids.

FIG. 5 is an isometric view of a leak detection cable 500 that is connected to an insulation displacement connector 502. The insulation displacement connector 502 may be an RJ-11 type connector, in which the four flat wire configuration 504 is placed in the connector 502. When the connector 502 is locked on the four flat wire configuration 504, the connector displaces the insulation on the wires and connects the connector 502 to the wires in an easy and simple manner.

Figure 6:
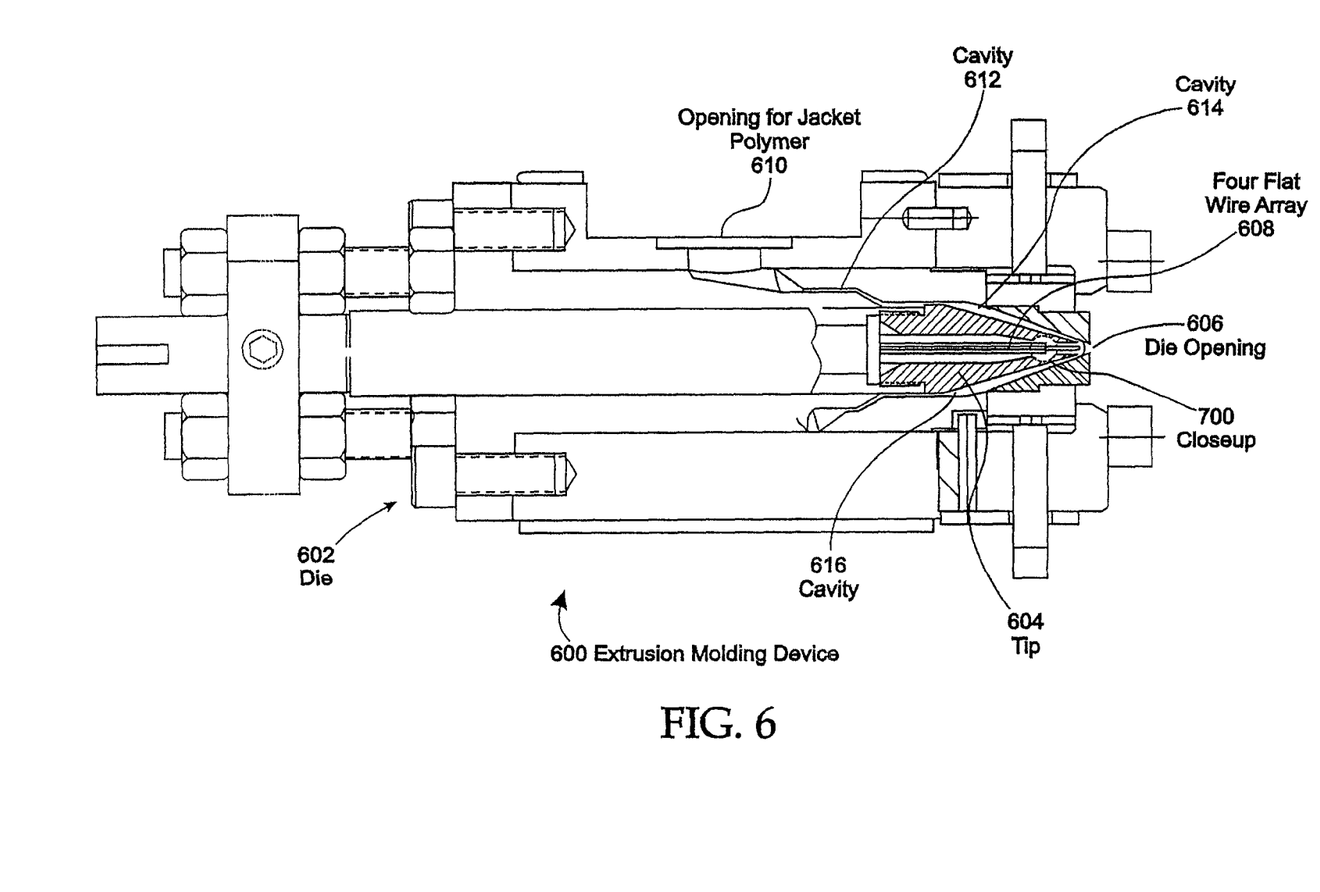
FIG. 6 is a cutaway side view of an extrusion molding device.

FIG. 6 is a cutaway side view of an extrusion molding device 600. As shown in FIG. 6, the extrusion molding device 600 comprises a die 602 and a tip 604. The die 602 has an opening 606 from which the heated polymer is extruded as a jacket around the four flat wire array 608. The polymer is inserted in the die 602 at the opening 610. The polymer is heated beyond its melting point and forced at high pressure into the cavities 612, 614, 616 around the outside of the tip 604. The size and shape of the cavities is dependent upon the particular polymer that is used for the jacket. As disclosed above, olefins or PVC materials, as well as other materials, may be used as the polymer that comprises the outer jacket. The die 602 and tip 604 are made to withstand the high temperatures and pressures that are necessary for the extrusion process. The extrusion molding device 600 provides the ability to make a continuous leak detection cable. Continuous lengths of as long as tens of thousands of feet can be made by the extrusion molding device 600. Not only does the ability to continuously extrude a leak detection cable in high volumes reduce the cost of the final product, the continuous extrusion design also allows for changes to be easily made in the type of plastic compounds that are used in the final design. The continuous extrusion process allows designers to incorporate various materials into the product based upon the environment in which the product will be used. For example, leak detection cables for detecting aqueous fluids may also require chemical resistance, oil or hydrocarbon resistance, acid resistance, sunlight or UV resistance, varying temperature ranges and weather resistance. The materials selected for the jacket and for the conductive coatings can be selected based upon the environment of these uses. In other words, different plastic compounds can be simply inserted in the opening for the jacket polymer 610 to change the jacket material during the extrusion process.

The extrusion molding device 600 uses a round conventional methodology for the extrusion process, which is common in wire and cable extrusion processes. In addition, profile extrusion methodology is also used, which is more commonly used in the profile industry for making products such as weather stripping, picture frames, molding, door seals, window seals, etc. Hence, the extrusion molding device 600 incorporates two different design technologies, i.e., round conventional extrusion methodology and profile methodology.

In addition, the continuous extrusion process is also utilized to make the wires that are used in the four flat wire array 608. These extrusions are done prior to the final assembly of the product in the extrusion molding device 600. As set forth above, the tip 604 guides and accommodates the four flat wire array 608 to be strategically located in the positions that result in the profiles illustrated in FIGS. 2, 3 and 4, and as disclosed more fully below. The manner in which the tip and die operate together results in the cross-sectional shapes illustrated in FIGS. 2, 3 and 4, so that a desirable surface area of the conductive members is exposed to the environment and the detector wires are insulated from each other, as well as from the non-conductive components.

Figure 7:
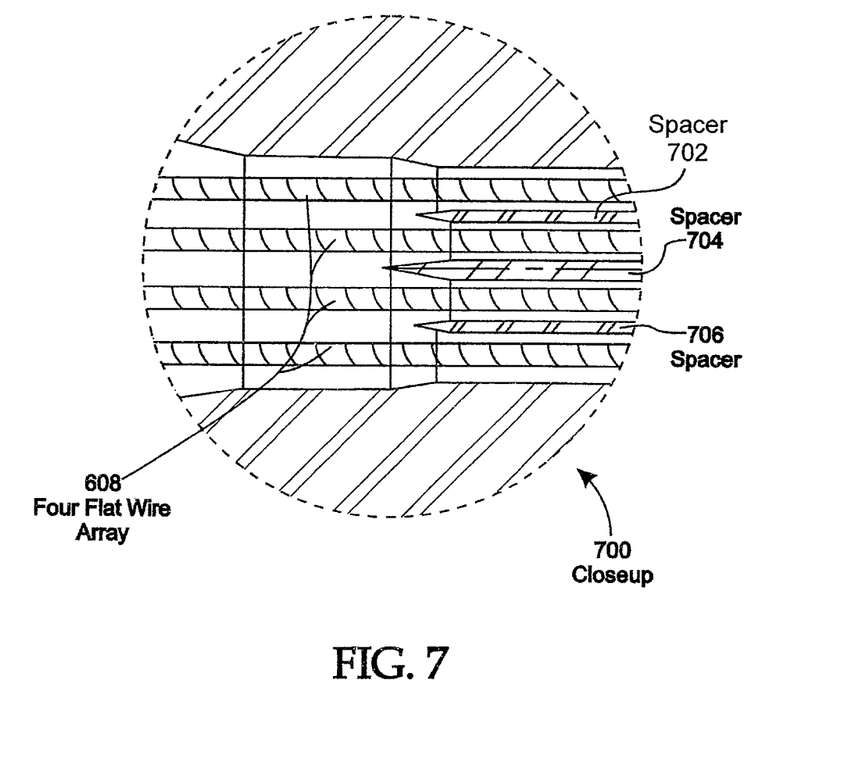
FIG. 7 is a close-up view of a portion of FIG. 6.

Close-up portion 700 of FIG. 6 is illustrated in FIG. 7. As shown in FIG. 7, a portion of the tip is illustrated in an enlarged, close-up view, showing the four flat wire array 608. Each of the wires has either a conductive coating or a non-conductive coating already applied in the standard manner in which insulation is applied to wires. The four flat wire array 608 is fed through the opening in the tip, as shown in FIG. 7. Spacers 702, 704, 706 separate the wires so that the center to center spacing substantially matches the spacing required for an insulation displacement connector, such as an RJ-11 connector. As shown in FIG. 6, the four flat wire array 608 is then fed through the die opening 606, where the polymer is extruded around the four flat wire array 608. The spacers 702, 704 and 706 carefully hold the four flat wire array 608 so that the four flat wire array 608 is strategically placed with respect to the die opening 606, illustrated in FIG. 8.

Figure 8:
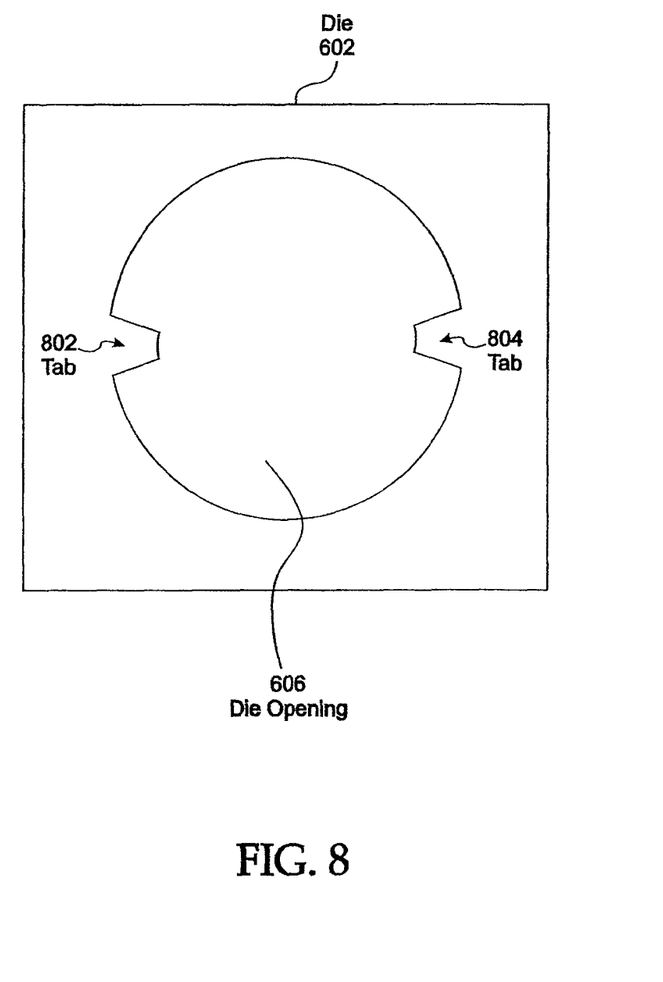
FIG. 8 is an end view of the die.

FIG. 8 is a close-up view of the end of the die 602. As shown in FIG. 8, the die 602 has a die opening 606, which matches the cross-sectional shape of the leak detection cable. Optional indentations (not shown) may also be included in die 602. The polymer is extruded through the die opening 606 around the four flat wire array that is centered in a horizontal plane across the middle of the die opening 606. The indented portion shown in the die opening 606 corresponds to the openings that are adjacent to the detector wires, as illustrated in FIG. 2. The die opening 606 can be formed by electrical discharge machining. The precise shape provides for the final shape of the extruded jacket. The two detector wires located on the outside of the four flat wire array 608 rub against the tabs 802, 804 of the die 602 during the extrusion process. Spacers 702, 706 (FIG. 7) hold the detector wires to produce the proper spatial orientation of the detector wires and tabs 802, 804. Since the detector wires on the outside of the four flat wire array 608 rub against the tabs 802, 804, the plastic of the jacket is prevented from coating the lateral outside surfaces of the detector wires. Tabs 802, 804 disallow the flow of the plastic of the jacket over the conductive members in those areas so that a desired portion of the conductive surface areas are exposed, while still providing a sufficient amount of structure to hold the detector wires in the jacket. Upon exiting the die 602, the assembled leak detection cable is cooled in free air and a water bath. The die 602 provides the final shape of the jacket prior to being twisted into a helix. The tip 604 (FIG. 6), as explained above, must be carefully mated to be compatible with the die to provide precise center to center spacing and to maintain each of the conductors in their prescribed locations. In addition, the die must be designed to have die angles and dimensions that can be modified to allow the use of plastics with different viscosities and flow rates to be shaped during the extrusion process. The extrusion process also allows for color coating of all components, which eliminates confusion in the field.

FIG. 9 discloses another embodiment of a leak detection cable 900. As disclosed in FIG. 9, the leak detection cable comprises a jacket 902 that has openings 904, 906, in which detector cables 908, 910 are disposed, respectively. In addition, the leak detection cable 900 includes feedback conductors 924, 926. Detector cables 908, 910 include detector wires 912, 914 that are surrounded by a protective, conductive polymer layer 916, 918, respectively. In addition, detector cables 908, 910 may include optional non-conductive, liquid pervious layers 920, 922. Either one, both or neither of the detector cables 908, 910 may include the optional non-conductive, liquid pervious layer. The purpose of the option, non-conductive, liquid pervious layer is to provide a non-conductive layer that assists in preventing false detection of leaks resulting from non-liquid contaminants and residues that would otherwise provide a conductive path between conductive polymer layer 916 and conductive polymer layer 918. The optional non-conductive, liquid pervious layers 920, 922 may comprise woven or braided polymer strands that have spaces allowing aqueous solutions to penetrate and contact the conductive polymer layers 916, 918. The strands are non-hydroscopic strands so that the strands do not absorb water and dry easily. The strands may be made from a material that has affinity to the material of the jacket 902. The combination of materials listed above can be used for this purpose. In this fashion, the optional non-conductive, liquid pervious layers 920, 922 insulate the conductive layers 916, 918 from contact from non-liquid conductive materials, including contaminants and residues.

Alternatively, the optional, non-conductive, liquid pervious layers 920, 922, that are illustrated in FIG. 9, may comprise a continuous, porous, non-conductive polymer that surrounds and isolates the conductive polymer layers 916, 918 and conductively isolates the conductive polymer layers 916, 918 from non-liquid materials, including contaminants and residues. The continuous, porous polymer coating may be obtained from Northwire, Inc., Osceola, Wis., and Putnam Plastics, Dayville, Conn. The continuous, porous polymer covering includes numerous pores that allow the passage of aqueous fluids to the conductive polymer layers 916, 918. The pores in the continuous, porous polymer covering are substantially smaller than the spaces between the braided fibers. The continuous, porous, non-conductive polymer covering is non-hydroscopic, so that the detector cables 908, 910 are easily dried out.

FIG. 9 also includes feedback conductors 924, 926. Feedback conductors 924, 926 include feedback wires 928, 930, as well as an optional insulating coating 932, 934, respectively. If the optional insulating coating 932, 934 is employed, the feedback conductors 924, 926 can be placed closely to each other, as well as closely to the openings 904, 906, as disclosed in FIG. 3. Alternatively, feedback wires 928, 930 can be embedded in the jacket 902 and thereby insulated from the sensor cables. Further, if the optional insulated coatings 932, 934 are not used, and if the optional, non-conductive, liquid pervious layers 920, 922 are used on both detector cables 908, 910, which provides a conductive insulation, the feedback wires 928, 930 can be disposed adjacent to the openings 904, 906.

Hence, the embodiments disclosed herein provide a leak detection cable in which the outer jacket can be easily removed to expose a four flat wire configuration that has the proper spacing to connect to a standard four flat wire insulation displacement connector. The detector cables are covered with a conductive coating, which increases the conductive surface area of each conductor by approximately 40%. The extruded conductive coating therefore provides a greater surface area for detection of aqueous fluids. In that regard, the greater surface area allows for a larger cross-section of the conductive plastic material to be entrapped and locked in the extruded jacket, to provide an interlocking construction that allows the conductive extrusion of the detector cables to remain solidly within the jacket, even though the jacket is twisted in a tight helix. Further, the conductive coating protects the metallic copper conductive wires of the detector cables from oxidation by shielding the conductive copper wires from air and moisture. The dissimilar materials used for the jacket, as compared to the coatings on the detector and feedback wires, allow the jacket to be easily stripped away from the wires without disturbing the integrity of the coatings of the wires. The plastic materials described provide resistance to a variety of chemicals, petroleum products, oils, acids and other corrosive fluids. In this manner, an inexpensive and easily constructed leak detection cable can be provided that is easily adapted for quick installation in the field. Also, a cross-linked polymer is used for the jacket so that the jacket can be heated and twisted, and remains in a helix after the jacket has cooled.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for making a leak detection cable comprising:
    extruding a conductive coating, that comprises a preselected conductive plastic, around at least one detector wire to form at least one detector conductor;
    extruding a non-conductive coating that comprises a preselected non-conductive plastic around at least one feedback wire to form at least one feedback conductor;
    extruding a jacket around said at least one detector conductor and said at least one feedback conductor so that said at least one feedback conductor is substantially surrounded by said jacket, and said at least one detector conductor is partially surrounded by said jacket by an amount sufficient to hold said at least one detector conductor in said jacket and provide an opening adjacent to said at least one detector conductor that exposes said at least one detector conductor to an exterior environment outside of said jacket to allow aqueous fluids outside of said jacket to directly contact said at least one detector conductor, said jacket comprising a plastic jacket material that is dissimilar to, and has low adhesion with, said preselected conductive plastic and said preselected non-conductive plastic so that said jacket can be easily removed from said detector conductor;
    twisting said jacket in a helix so that said at least one detector conductor is sequentially exposed along a linear surface of said leak detection cable;
    wherein said detector conductor and said feedback conductor are placed in a plane with a substantially equal center to center spacing required for use of an insulation displacement connector.

2. The method of claim 1 further comprising:
    providing a non-conductive, liquid pervious layer that surrounds said conductive coating around at least one detector conductor.

* * * * *